US00RE44124E

(19) United States
(12) Reissued Patent
Lovell et al.

(10) Patent Number: US RE44,124 E
(45) Date of Reissued Patent: Apr. 2, 2013

(54) REGENERABLE HIGH CAPACITY SORBENT FOR REMOVAL OF MERCURY FROM FLUE GAS

(75) Inventors: John Lovell, Isle of Wight (GB); Craig Turchi, Lakewood, CO (US); Thomas E. Broderick, Arvada, CO (US)

(73) Assignee: Novinda, Inc., Denver, CO (US)

(21) Appl. No.: 12/608,123

(22) Filed: Oct. 29, 2009

Related U.S. Patent Documents

Reissue of:
(64) Patent No.: 7,288,499
Issued: Oct. 30, 2007
Appl. No.: 10/783,264
Filed: Feb. 19, 2004

U.S. Applications:
(63) Continuation-in-part of application No. 10/681,671, filed on Oct. 7, 2003, now Pat. No. 7,048,781, which is a continuation-in-part of application No. 10/134,178, filed on Apr. 26, 2002, now Pat. No. 6,719,828.

(60) Provisional application No. 60/287,939, filed on Apr. 30, 2001, provisional application No. 60/416,994, filed on Oct. 7, 2002.

(51) Int. Cl.
*B01J 21/16* (2006.01)
*B01J 27/02* (2006.01)
*B01J 27/053* (2006.01)
*B01J 23/08* (2006.01)

(52) U.S. Cl. ..... 502/80; 502/216; 502/217; 502/263; 502/355; 502/410; 502/412; 502/414; 502/516

(58) Field of Classification Search ..... 502/80, 502/216, 217, 263, 355, 410, 412, 414, 516
See application file for complete search history.

(56) References Cited

U.S. PATENT DOCUMENTS

| | | | | |
|---|---|---|---|---|
| 4,069,140 | A * | 1/1978 | Wunderlich | 208/251 H |
| 4,474,896 | A * | 10/1984 | Chao | 502/216 |
| 4,902,662 | A * | 2/1990 | Toulhoat et al. | 502/216 |
| 5,245,106 | A * | 9/1993 | Cameron et al. | 585/823 |
| 5,350,728 | A * | 9/1994 | Cameron et al. | 502/415 |
| 6,719,828 | B1 * | 4/2004 | Lovell et al. | 95/134 |
| 7,048,781 | B1 * | 5/2006 | Lovell | 95/134 |
| 7,183,235 | B2 * | 2/2007 | Lovell et al. | 502/410 |
| 7,288,499 | B1 * | 10/2007 | Lovell et al. | 502/80 |
| 7,326,346 | B2 * | 2/2008 | Lovell et al. | 210/660 |
| 7,578,869 | B2 * | 8/2009 | Yang et al. | 95/134 |
| 7,771,700 | B2 * | 8/2010 | Mauldin et al. | 423/566.3 |

* cited by examiner

*Primary Examiner* — Patricia L Hailey
(74) *Attorney, Agent, or Firm* — Neugeboren O'Dowd PC

(57) ABSTRACT

A regenerable, high-capacity sorbent for removal of mercury from flue gas and processes and systems for making and using the sorbent. A phyllosilicate substrate, for example vermiculite or montmorillinite, acts as an inexpensive support to a thin layer for a polyvalent metal sulfide, ensuring that more of the metal sulfide is engaged in the sorption process. The sorbent is prepared by ion exchange between the silicate substrate material and a solution containing one or more of a group of polyvalent metals including tin (both Sn(II) and Sn(IV)), iron (both Fe(II) and Fe(III)), titanium, manganese, zirconium and molybdenum, dissolved as salts, to produce an exchanged substrate. Controlled reaction of a sulfide ion source with the one or more polyvalent metals that are exchanged on the silicate substrate produces the sorbent. The sorbent is used to absorb elemental mercury or oxidized mercury species such as mercuric chloride from flue gas containing acid gases (e.g., $SO_2$, NO and $NO_2$, and HCl) and other gases over a wide range of temperatures.

50 Claims, 3 Drawing Sheets

REGENERABLE HIGH CAPACITY SORBENT FOR REMOVAL OF MERCURY FROM FLUE GAS

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. patent application Ser. No. 10/134,178, filed Apr. 26, 2002, now U.S. Pat. No. 6,719,828, which claims the benefit of U.S. Provisional Application No. 60/287,939, filed Apr. 30, 2001, now expired, the disclosure of which applications are incorporated by reference as if fully set forth herein. This application is also a continuation-in-part of U.S. patent application Ser. No. 10/681,671 filed Oct. 7, 2003, now U.S. Pat. No. 7,048,781, which claims the benefit of U.S. Provisional Application No. 60/416,994, filed Oct. 7, 2002, now expired.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. 68-D-00-225 awarded by the U.S. Environmental Protection Agency.

BACKGROUND OF THE INVENTION

This invention relates to a composition for gas treatment and processes and systems for making and using the composition. In particular, the invention relates to a high capacity regenerable sorbent for removal of mercury from flue gas and processes and systems for making and using the sorbent.

In December, 2000, the U.S. Environmental Protection Agency (EPA) announced its intention to regulate mercury and other air toxics emissions from coal- and oil-fired power plants with implementation as early as November, 2007 (Johnson, J., "Power Plants to Limit Mercury," Chemical and Engineering News, 2001, p. 18, 79). The pending regulation has created an impetus in the utility industry to find cost-effective solutions to meet the impending mercury emission standards.

Mercury and its compounds are a group of chemicals identified in Title III of the 1990 Clean Air Act (CAA) Amendments as air toxic pollutants. Mercury is of significant environmental concern because of its toxicity, persistence in the environment, and bioaccumulation in the food chain. Mercury is one of the most volatile species of the 189 toxic compounds listed in the Clean Air Act Amendments and is, therefore, released readily into the environment from natural and anthropogenic sources. Because of its physical and chemical properties, mercury can also be transported regionally through various environmental cycles (Mercury Study Report to Congress, "Volume VIII: An Evaluation of Mercury Control Technologies and Costs," U.S. Environmental Protection Agency, EPA-452/R-97-010, December, 1997). Atmospheric deposition of mercury is reported to be the primary cause of elevated mercury levels in fish found in water bodies remote from known sources of this heavy metal.

Domestic coal-fired power plants emit a total of about fifty metric tons of mercury into the atmosphere annually—approximately thirty-three percent of all mercury emissions from U.S. sources (Mercury Study Report to Congress, "Volume I: Executive Summary," United States Environmental Protection Agency, EPA-452/R-97-010, December, 1997; Midwest Research Institute, "Locating and Estimating Air Emissions from Sources of Mercury and Mercury Compounds," EPA-45/R-93-023, September, 1993). Specially designed emission-control systems may be required to capture these volatile compounds effectively. A coal-fired utility boiler emits several different mercury compounds, primarily elemental mercury, mercuric chloride ($HgCl_2$), and mercuric oxide (HgO)—each in different proportions, depending on the characteristics of the fuel being burned and on the method of combustion. Quantifying the rate and composition of mercury emitted from stationary sources has been the subject of much recent work (e.g., Devito, M. S. et al., "Flue Gas Hg Measurements from Coal-Fired Boilers Equipped with Wet Scrubbers," 92$^{nd}$ Annual Meeting Air & Waste Management Association, St. Louis, Mo., Jun. 21-24, 1999; Laudal, D. L. et al., "Bench and Pilot Scale Evaluation of Mercury Measurement Methods," DOE/EPRI/EPA Joint Workshop on Mercury Measurement and Speciation Methods, Research Triangle Park, N.C., Jan. 29-30, 1997; Hargrove, O. W. et al., "Enhanced Control of Mercury by Wet FGD," proceedings of First Joint Power and Fuel Systems Contractors Conference, Pittsburgh, Pa., Jul. 9-11, 1996; Agbede, R. O., A. J. Bochan, J. L. Clements, R. P. Khosah, T. J. McManus, "A Comparative Evaluation of EPA Method 29, the Ontario Hydro Method, and New Impinger Solution Methods for the Capture and Analysis of Mercury Species," proceedings of the First Joint Power and Fuel Systems Contractors Conference, Pittsburgh, Pa., Jul. 9-11, 1996). Mercury is found predominantly in the vapor-phase in coal-fired boiler flue gas (Mercury Study Report to Congress, "Volume VIII: An Evaluation of Mercury Control Technologies and Costs," United States Environmental Protection Agency, EPA-452/R-97-010, December, 1997). Mercury can also be bound to fly ash in the flue gas. Currently, there is no available control method that efficiently collects all mercury species present in the flue gas stream. Coal-fired combustion flue gas streams are of particular concern because of their composition that includes trace amounts of acid gases, including $SO_2$, NO and $NO_2$, and HCl. These acid gases have been shown to degrade the performance of activated carbon, the most widely available sorbent for mercury control, and other proposed sorbents, and so present a challenge that is addressed by the invention described herein.

Today, only municipal solid waste (MSW) incinerators and medical waste combustors are regulated with respect to mercury emissions, and, until the present, the best available control technology for these incinerators is the injection of activated carbon. Although fairly effective for MSW incinerators, activated carbon is a less appealing solution for coal-fired flue gas streams because of the dramatic difference in mercury concentrations. Regulations for mercury control from municipal and medical waste incinerators specify eighty percent control, or outlet emission levels of fifty micrograms per cubic meter ($\mu g/m^3$). In coal-fired flue gas streams, typical uncontrolled mercury concentrations are on the order of ten $\mu g/m^3$. For such low concentrations, projected injection rates for activated carbon to maintain ninety percent control of mercury emissions from coal-fired flue gas streams are high—up to 10,000 pounds or more of activated carbon to remove one pound of mercury, depending on the concentration and speciation of mercury in the flue-gas. The mercury-contaminated carbon becomes part of the ash collected by particulate-control devices and can convert the fly ash from an asset to a liability. This impact on the salability of collected fly ash can double the estimated cost of mercury control for a coal-fired power plant.

At present, the injection of activated carbon is broadly considered the best available control technology for reduction of mercury emissions from coal-fired power plants that do not have wet scrubbers (about seventy-five percent of all plants). Tests of carbon injection, both activated and chemically impregnated, have been reported by several research teams: Miller, S. J., et al., "Laboratory-Scale Investigation of Sorbents for Mercury Control," paper number 94-RA114A.01, presented at the 87$^{th}$ Annual Air and Waste Management Meeting, Cincinnati, Ohio, Jun. 19-24, 1994; Sjostrom, S., J. et al., "Demonstration of Dry Carbon-Based Sorbent Injection for Mercury Control in Utility ESPs and Baghouses," paper 97-WA72A.07, 90$^{th}$ Annual Meeting of the Air and Waste Management Association, Toronto, Ontario, Canada, Jun. 8-13, 1997; Bustard, C. J. et al., "Sorbent Injection for Flue-gas Mercury Control," presented at the 87th Annual Air and Waste Management Meeting, Cincinnati, Ohio, Jun. 19-24, 1994; and Butz, J. R. et al., "Use of sorbents for Air Toxics Control in a Pilot-Scale COHPAC Baghouse," 92$^{nd}$ Annual Meeting Air & Waste Management Association, St. Louis, Mo., Jun. 21-24, 1999. Activated carbon injection ratios for effective mercury control are widely variable and are explained by the dependence of the sorption process on flue gas temperature and composition, mercury speciation and also on fly ash chemistry.

The effectiveness of carbon injection for mercury control is limited by sorbent capacity and flue-gas interactions with the activated carbon. Flue gases contain several acid gases including sulfur dioxide ($SO_2$) in the range of a few hundred to a few thousand parts per million (ppm); hydrogen chloride (hydrochloric acid, HCl) up to 100 ppm; and nitrogen oxides (e.g., $NO_2$) in the range of 200 to 2,000 ppm. Studies reported by Miller, S. J et al., in "Mercury Sorbent Development for Coal-Fired Boilers," presented at Conference on Air Quality: Mercury, Trace Elements, and Particulate Matter, McLean, Va., December 1998, at the University of North Dakota's Energy & Environmental Research Center (EERC) examined the effects of various acid gas constituents on the sorption capacity of carbon in a full-factorial test matrix. The EERC workers fed elemental mercury through carbon samples and systematically changed the gas composition. They noted a limited impact by $SO_2$, but a dramatic drop in capacity when HCl or $NO_2$ were present with $SO_2$. Similar results were obtained in studies in a mercury test fixture by one of the applicants (Turchi, C., "Novel Process for Removal and Recovery of Vapor-Phase Mercury," Final Report for Phase II, DOE Contract DE-AC22-95PC95257, Sep. 29, 2000). Thus, the instability of background art sorbents in an acidic flue gas environment adversely affects the utility of activated carbon sorbents and other sorbents having this limitation.

The cost to implement activated carbon mercury control systems has been estimated by the Department of Energy (DOE), EPA, and several researchers. Chang, R. et al., in "Mercury Emission Control Technologies," Power Engineering, November, 1995, pp. 51-56, state that with operating and amortized capital costs, carbon injection will cost between $14,000 and $38,000 per pound of mercury removed, which equates to over $4 million per year for a 250-megawatt (MW) power plant.

EPA estimated similar costs for a 975-MW power plant (Mercury Study Report to Congress, "Volume VIII: An Evaluation of Mercury Control Technologies and Costs," U.S. Environmental Protection Agency, EPA-452/R-97-010, December, 1997). In their model, four mercury control scenarios were considered to achieve ninety percent reduction in mercury emissions for a plant with an existing ESP. The scenarios were: (1) activated carbon injection; (2) spray cooling and activated carbon injection; (3) spray cooling, activated carbon injection with added fabric filter collection device; and (4) added activated carbon filter bed. The most economical control option employed spray cooling with carbon injection, resulting in a specific cost of $14,000 per pound mercury removed.

The development of more efficient sorbents that can function in the presence of acids would greatly reduce the cost of this mercury control approach by decreasing the amount of sorbent injected, downsizing sorbent injection equipment, and reducing costs for handling and disposing of spent sorbent.

The potential limitations of carbon-based sorbents cited above have led to research into other possible mercury sorbents. Research has demonstrated that noble-metal-impregnated alumina will remove elemental mercury and mercuric chloride from air streams. The sorbent can be thermally regenerated and the desorbed mercury captured in a condenser or oxidizing wet scrubber. Initial cost estimates looked attractive compared with the cost of disposable carbon sorbents (Turchi et al., "Removal of Mercury from Coal Combustion Flue-Gas Using Regenerable Sorbents," 92$^{nd}$ Annual Meeting Air & Waste Management Association, St. Louis, Mo., Jun. 21-24, 1999). In 1998 and 1999, work at coal-combustion facilities in Pennsylvania and New Jersey demonstrated that the sorbent can function in flue-gas but at lower efficiency than was seen in the earlier laboratory tests. Subsequent lab work has suggested that acid-gas attack on the sorbent will reduce its effectiveness, as is the case for all background art sorbents. There is also some indication of flue-gas interactions similar to those witnessed by the EERC group. Research is continuing to determine whether the detrimental effects are temporary or permanent.

Fixed beds of zeolites and carbons have been proposed for a variety of mercury-control applications, but none has been developed specifically for control of mercury in coal flue-gas. Products in this class include Lurgi GmbH's (Frankfurt, Germany) Medisorbon and Calgon Carbon Corporation's (Pittsburgh, Pa.) HGR. Medisorbon is a sulfur-impregnated zeolite and costs ~$17/lb. As with most sulfur-impregnated materials, Medisorbon loses sulfur when heated above 200° F., due to the vapor pressure of sulfur.

The background art is characterized by U.S. Pat. Nos. 3,194,629; 3,873,581; 4,069,140; 4,094,777; 4,101,631; 4,233,274; 4,474,896; 4,721,582; 4,814,152; 4,843,102; 4,877,515; 4,902,662; 4,911,825; 4,962,276; 4,985,389; 5,080,799; 5,120,515; 5,141,724; 5,173,286; 5,245,106, 5,248,488; 5,409,522; 5,695,726; and 5,846,434; the disclosures of which patents are incorporated by reference as if fully set forth herein.

No individual background art reference or combination of references teach the compositions, processes and systems disclosed herein. In fact, background art references teach away from the elegant solutions proposed herein.

BRIEF SUMMARY OF THE INVENTION

The purpose of the invention is to provide compositions, processes and systems for removal of heavy metals from gas streams, especially those resulting from the combustion of coal which contain the precursors of acid gases such as $SO_2$, NO, $NO_2$, and HCl. One advantage of the invention is that the compositions (sorbents) disclosed herein have a capacity for mercury that greatly exceeds that of the baseline technology, activated carbon. Another advantage is that the disclosed sorbents are unaffected by typical acidic flue gases, which can render background art activated-carbon-based and zeolite-based sorbents virtually useless for this task. Applicants believe that this property is due to the layered structure of the metal sulfide amendments (chalcogenides) used in preferred embodiments of the invention. This layered structure has dimensions such that the polar acid gas molecules are excluded from interlayer sites on the amendment, eliminating the potential for degradation of sorbent performance due to the acid gases. A further advantage is that the strategy of deploying the sorbents into the flue gases as amendments on an inert support maximizes the efficiency and minimizes the costs of the sorbents by exposing only molecularly thin films to the mercury. As a result, all of the sorbent is presented to the flue gas, on a very inexpensive substrate. In addition to having sorption characteristics that are far superior to activated carbon for both elemental and oxidized mercury, the sorbents disclosed herein are less expensive than activated carbon and do not, unlike activated carbon, adversely impact the value of the fly ash, for example, by adversely affecting its use as a concrete additive. Preferred forms of the sorbents disclosed herein ensures that they are "drop-in" replacements for carbon technology and do not require any additional technologies for injection, or collection. The improved capacity and efficiency and the lower costs for the disclosed technology promise to substantially reduce the costs of implementing the EPA's new emissions controls, benefiting both the utility industry and the U.S. public.

In most flue gas treatment systems, the contact time of a mercury sorbent with a mercury-containing gas is of very brief duration and, therefore, only the surface layers of the sorbent actually perform the sorption. In the invention disclosed herein, the silicate substrate acts an inexpensive support to a thin layer of the polyvalent metal sulfide, ensuring that all of the more expensive metal sulfide engages in the sorption process. While estimated manufactured costs for preferred embodiment of the invention were found to be comparable to the cost of activated carbon, because the mercury sorption capacity of the sorbents disclosed herein is three times the capacity for activated carbon (and much more in the presence of acidic flue gases), the annual operating cost of the disclosed sorbent injection system is expected be no more than one-third the estimated annual operating cost for an activated carbon injection system.

The disclosed compositions are able to adsorb mercury at mass ratios of greater than 1:1 under laboratory conditions. In addition, although the sorbent forms a strong chemical bond with mercury at temperatures typically found with flue gas, the compounds can be thermally regenerated at slightly higher temperatures, allowing for reuse of the sorbent and recovery of mercury for recycling or stabilization.

The disclosed invention is expected to greatly reduce the cost of this mercury control by decreasing the amount of sorbent injected, downsizing sorbent injection equipment, and reducing costs for handling and disposing of spent sorbent. In preferred embodiments, regenerating rather than disposing of spent sorbents is expected to further improve process economics.

The formulation of the sorbents disclosed herein also results in stronger bonding of the mercury to the chemical amendment of the substrate material. The mercury present on used sorbent is thus more difficult to remove, resulting in a final waste form that is more stable and less likely to return the captured mercury to the environment via leaching or other natural processes after disposal.

One object of the invention is to reduce the cost and increase the effectiveness of mercury sorbents and to increase the cost effectiveness of methods and systems for removing mercury from flue gases. Another object of the invention is to prevent contamination of fly ash with activated carbon, thus facilitating its reuse.

In a preferred embodiment, the invention is concerned with a novel mercury sorbent composition. In this embodiment, phyllosilicates having a first layered structure are amended with metal sulfides (e.g., chalcogenides) having a second layered structure, with the open layers of the second layered structure lined with both metal and sulfur ions. While not wishing to be limited by their theory, applicants believe that the layers of the metal sulfides are held together by weak Van der Waals bonds and thus, mercury can enter into these inter-layer openings whereas the acid gases are excluded and cannot interfere with the adsorption of mercury. The preferred inter-layer spacing is approximately five nanometers (nm). When the sorbent is used, once mercury has entered the inter-layer spaces, it is retained by interaction with the sulfur-rich environment and amalgamation with the metal ions.

In a preferred embodiment, the invention is concerned with a process for preparing a solid sorbent and product prepared therefrom. The preferred multi-step process includes the steps of obtaining a layered silicate material; performing an ion exchange between the silicate substrate material and a solution containing one or more polyvalent metals from the transition series (e.g., Sn(II), Sn(IV), Fe(II), Fe(III), Ti, Mn, Zn, Mo); washing the impregnated substrate with water; contacting the impregnated and washed substrate with a gas phase or liquid phase source of sulfide (e.g., Thio-Red®; recovering a sulfided substrate (the exchanged polyvalent metal ions precipitate as an insoluble sulfide and become locked in place within the silicate lattice); spray drying the sulfided substrate; and recovering a high capacity sorbent.

The high capacity sorbent is preferably employed to capture elemental mercury or oxidized mercury species (mercuric chloride) from flue gas and other gases at temperatures from ambient to 350° F. A fixed bed may be employed, or the sorbent may be injected directly into the gas stream.

The sorbent may be regenerated by heating to approximately 500° F. in a fixed bed or fluidized bed. Preferably, an inert gas (e.g., nitrogen) is flowed through the bed to sweep away the desorbed mercury.

Though not wishing to be bound by their theory, applicants believe that the metal sulfides of the invention disclosed herein act as very efficient sorbents for heavy metals such as mercury due to their planar crystal lattice structure. The crystal lattices of the sorbents of the subject invention are arranged in planar arrays creating open layers, lined with sulfur atoms and/or metal ions. The open nature of these layers permits ready access for mercury atoms and ions, but the spacing of the parallel planes is such that acid gases cannot contact the metal sulfide molecules, and therefore do not impact the performance of the sorbent. The sulfur atoms have a strong affinity for mercury, which becomes tightly bound within the crystal lattice. Furthermore, certain metals such as tin and titanium form amalgams with mercury, further enhancing the binding mechanism. In the case of tin (II) sulfide, for example, the interlayer gaps are lined with alternating rows of tin and sulfide atoms. Advantageously, the mercury thus has the potential to bind to every atom of the silicate amendment.

Preferred embodiments of the disclosed compositions comprise transitional metal dichalcogenides (TMDs) and/or polyvalent metal sulfides (PVMS). These TMD and PVMS compounds have a layered structure with opposing sulfur atoms. The gap formed between the layers create an interplanar space, where heavy metals are highly attracted due to the high density of the sulfur atoms. Further, the interlayer spacing is such that acid gas molecules are excluded from the space, and thus cannot impact the performance of the sorbent. This two-dimensional layered structure creates compounds similar in many ways to graphite. Uptake of metals occurs by insertion of the metal within the two-dimensional layered structure in a phenomenon known as intercalation. Intercalation is a chemical insertion reaction by which atoms (generally metals) can be inserted between the layers of two-dimensional layered compounds without altering the basic structure of the host material. Tin and metals in the first few columns of the transition block of the periodic table are capable of forming these layered structures.

Preferred embodiments of the disclosed compositions also comprise a substrate, preferably a phyllosilicate. In phyllosilicate minerals, rings of tetrahedrons are linked by shared oxygens to other rings in a two dimensional plane that produces a sheet-like structure. Typically, the sheets are then connected to each other by layers of cations. These cation layers are weakly bonded and often have water molecules and other neutral atoms or molecules trapped between the sheets. The silicon to oxygen ratio is generally 1:2.5 (or 2:5) because only one oxygen is exclusively bonded to the silicon and the other three are half shared (1.5) to other silicons. The symmetry of the members of this group is controlled chiefly by the symmetry of the rings but is usually altered to a lower symmetry by other ions and other layers; but the overlying symmetry of the silicate sheets will usually still be expressed in a higher pseudo-symmetry. The typical crystal habit of phyllosilicates is flat, platy, book-like and most all members display good basal cleavage. Although members tend to be soft, they are remarkably resilient. Phyllosilicates are also generally tolerant of high pressures and temperatures.

Vermiculite (i.e., hydrated laminar magnesium-aluminum-ironsilicate that resembles mica in appearance) is one preferred sorbent substrate, given its ion exchange capacity, commercial availability, and low cost. Vermiculite is the name applied to a group of magnesium aluminum iron silicate minerals, with a variable composition that may be summarized thus:

$$(Mg,Ca)_{0.7}(Mg,Fe^{3+},Al)_{6.0}[(Al,Si)_8O_{20}](OH)_4.8H_2O$$

Flakes of raw vermiculite concentrate are micaceous in appearance and contain interlayers of water in their structure. When the flakes are heated rapidly, or treated with hydrogen peroxide, the flakes expand, or exfoliate, into accordion-like particles. The resulting lightweight material is chemically inert, fire resistant, and odorless. Vermiculite is widely used in lightweight plaster and concrete, providing good thermal insulation. For this reason, the addition of vermiculite to fly ash materials is not likely to affect the properties of concrete made with it, unlike the addition of carbon to fly ash.

Vermiculite is a phyllo-, or layered silicate with a generalized structure similar to that of talc. It has a central, octahedrally coordinated layer of iron and magnesium oxides lying between two inwardly pointing sheets of silica tetrahedra. In vermiculite, iron and magnesium ions substitute for silicon in the tetrahedral layer and the resulting electrical imbalance is neutralized by loosely bound interlayer ions of calcium, magnesium, or more rarely, sodium. The interlayer space also includes two ordered layers of water molecules. The calcium and magnesium ions within the interlayer space can be replaced by other metal ions to give vermiculite a very high ion-exchange capacity. Vermiculite is not described in the literature as an aluminosilicate.

Montmorillonite is another preferred sorbent substrate. Montmorillonite, also known as smectite, bentonite, or Fuller's Earth, is a clay weathering product of aluminosilicate minerals. These clays typically develop in semi-arid regions from solutions with high concentrations of magnesium ions and can be made synthetically. Montmorillonite is a cryptocrystalline aluminosilicate. Montmorillonite clays are constructed of a single sheet of alumina octahedra, sandwiched between two layers of silica tetrahedra. Substitution of other atoms ($Mg^{2+}$, $Fe^{2+}$, or $Mn^{2+}$) for the aluminum in the octahedral layer or $Al^{3+}$ substitution for silicon in the tetrahedral layer leads to interlayer charge imbalance, producing one excess negative charge for each substituted atom. Cations intercalate into the interlayer areas to balance the charge. Water molecules are also present in the interlayer areas.

The hydrated interlayer space between the sheets is expansible, that is, the separation between the individual smectite sheets varies depending upon the interlayer cations present. Because the interlayer area is hydrated, cations within the interlayer may easily exchange with cations in an external solution, providing that charge balance is maintained. This leads to very high cation exchange capacities in these materials that may be as high as 80-150 mEq/100 g. The availability of the interlayer areas and the very small particle size lead to these clays having extremely large effective surface areas.

The typical particulate size of montmorillonite is in the range of a few microns diameter, which makes it easy to inject and suspend in a flue gas stream, where it is exposed to mercury. By using a particle size that is similar to the fly ash, thorough mixing of the sorbent material into the gas stream is assured. This in turn minimizes the mass of sorbent that is required to achieve proposed mercury removal levels. Its handling and injection into a flue gas stream is similar to that of activated carbon, done with conventional materials handling equipment and requiring residence times for the sorbent on the order of about one second to achieve superior mercury removal from the flue gas stream. The silica content of the montmorillonite renders it easily collectable in an electrostatic precipitator. And that same silica content also renders the collected fly ash and sorbent mixture readily salable as a pozzolan material, a clear advantage over activated carbon.

Allophane is another preferred sorbent substrate. Allophane is a synthetic amorphous aluminosilicate with a high cation exchange capacity. Thus, both natural and synthetic amorphous aluminosilicate materials are preferred as sorbent substrates.

In a preferred embodiment, sorbent preparation is a multistep process that includes the exchange of metals and addition of sulfide ions to the phyllosilicate substrate material. Preferably, the first step in the preparation of the sorbent is an ion exchange between the phyllosilicate substrate material and a solution containing one or more of a group of polyvalent metals including tin (both Sn(II) and Sn(IV)), iron (both Fe(II) and Fe(III)), titanium, manganese, zirconium and molybdenum, dissolved as salts, such as the sulfate, chloride or nitrate, or as other soluble forms. Ion exchange is preferably performed by suspending or otherwise contacting the phyllosilicate substrate with the solution containing a metal ion for a period of time sufficient to complete the process. Preferably, the solution is stirred or mixed during this time to facilitate the exchange. When the ion exchange is complete, the phyllosilicate substrate material is preferably separated from the solution and may be briefly washed with water. Separation can be accomplished by any number of means, many of which are well established and generally known to those in the field of process engineering. Examples include settling, filtration, and centrifugation. In a preferred embodiment, the metal solution is reused directly or processed to recover unused metal ions.

In a preferred embodiment, contact between the phyllosilicate substrate and the metal ion solution occurs as a multi-step batch or continuous process in which quantities of substrate and solution are sequentially contacted with each other in stages. This process is preferably performed in either a co-current or counter-current manner.

In a preferred embodiment, the second step in the preparation of the sorbent is the controlled addition of thiocarbonate, sulfide or polysulfide ions to the phyllosilicate substrate as described below. This is preferably accomplished by contacting the exchanged phyllosilicate substrate with a liquid phase source of sulfide.

Preferable sources of sulfur or sulfide for gas-phase contacting include hydrogen sulfide. Preferable sources of sulfur or sulfide for liquid-phase contacting include sodium sulfide ($Na_2S$), calcium polysulfide ($CaS_x$) and the thiocarbonate ion ($CS_3^{-2}$). An aqueous solution comprising Thio-Red® is one preferred sulfide source because its pH can be adjusted and still retains its sulfide characteristic.

Sulfide addition in the liquid phase is preferably accomplished by the incremental addition of a solution containing a sulfide source (e.g., sulfide ions, polysulfide ions and/or thiocarbonate ions, for example, from Thio-Red®) to a liquid containing the phyllosilicate substrate material impregnated with the exchanged polyvalent metal ions. Preferably, the pH of the Thio-Red® solution is treated with HCl to reduce its pH from about 11.8 to a pH of about 7 to about 8. The pH-adjusted Thio-Red® solution is added to the solution containing the substrate material impregnated with the exchanged polyvalent metal ions until the solution pH is about 7 to about 8. During this process, the exchanged polyvalent metal ions precipitate as an insoluble sulfide and become locked in place within the phyllosilicate lattice. In a preferred embodiment, the amended phyllosilicate is then separated from the solution by settling, filtration or centrifuging. The separated sorbent is then re-slurried and processed though a spray drier to separate solids, dry the solids and size the sorbent solids. Preferably, the amended phyllosilicate material is dried to less than about five percent moisture such that the material is flowable.

In a more preferred embodiment, filtration is used to separate the solids from the sulfidation solution, and the separated solids are then re-slurried with water for feed to the spray dryer for drying and particle sizing. If needed, the spray-dried material is ground in an additional step to achieve the preferred particle size distribution.

In another preferred embodiment, the sorbent disclosed herein is used to absorb elemental mercury or oxidized mercury species such as mercuric chloride from flue gas and other gases at temperatures from ambient to as high as 350° F. In a preferred embodiment, the operational temperature range for the sorption process operating at near ambient pressure conditions is about 350° F. and less. Sorption processes conducted at higher pressures (e.g., at sixty psi) can be operated at temperatures near 500° F. Applicants believe that 350° F. is a likely practical upper limit for the sorption process at atmospheric pressure. Sorbent performance degrades with increasing temperature, and improves with decreasing temperature. The practical lower limit is related to the acid dew point of the gas stream, at which the $SO_2$ in the gas begins to condense to form sulfurous acid. This can become a major corrosion issue in ductwork of a power plant. For high sulfur coals, where $SO_2$ levels can easily be a few thousand ppm, the acid dew point can be in the range 250-270° F. For low-sulfur coals, the $SO_2$ is typically 400 ppm or less, and the acid dew point may be less than 180° F.

Absorption takes place while the sorbent is in contact with the gas. This can occur in a number of conventional process configurations, e.g., injection into the flue gas stream traveling from the economizer to the particulate control equipment or as a fixed bed installed downstream of the particulate control equipment. In a preferred embodiment, the sorbent is contained within a fixed bed in which it is substantially stationary. In this embodiment, contact between the gas and sorbent is achieved as the gas flows through the bed. Applicants believe that a few seconds of contact is adequate. The size of the bed is more typically dependent on how often it is to be changed or regenerated. In a preferred embodiment, an empty bed residence time of less than one second, nominally 0.7 second is provided. Applicants believe that an optimum contact time is 1.5 seconds.

Another process configuration for sorbent use comprises directly injecting and entraining the sorbent into the gas stream. For a coal-fired power plant, sorbent is preferably injected into the gas stream downstream of the boiler and remains in the gas stream until it is removed along with the flyash using an electrostatic precipitator and/or a baghouse. In this configuration, contact is achieved while the sorbent is entrained in the gas and also during the time it is fixed to the separation device. In any configuration, an adequate contact time (preferably at least one or two seconds) is required to ensure proper sorption of the mercury onto or into the sorbent.

In a preferred embodiment, when mercury sorption is complete, the sorbent is stabilized and disposed of using any of a variety of conventional techniques, e.g., landfilled along with the collected fly ash or sold along with the fly ash for use as a pozzolan additive in concrete. The sorbent may also be regenerated by heating it to about 500° F. and maintaining it at that temperature for a time that is sufficient to desorb the mercury from the sorbent. Preferably, sorbent regeneration occurs in a fixed or fluidized bed. During the regeneration step, an inert gas such as nitrogen is preferably flowed through the bed to sweep desorbed mercury away from the sorbent. Preferably, desorbed mercury is captured for reuse or disposal using any of a variety of conventional techniques, e.g., the mercury can be condensed as the liquid element in a chilled condenser, or captured as mercuric oxide in a chemical wet scrubber. Preferably, the wet scrubber is one disclosed in U.S. Pat. No. 5,833,736 or U.S. Pat. No. 5,893,943 the disclosures of which patents are incorporated by reference as if fully set forth herein. In preferred embodiments, desorption from a fixed bed takes about one-half to one times the total sorption time to which the sorbent has been subjected.

The above description is for a preferred operating mode in which the pressures at which mercury is adsorbed onto and into the sorbent and at which it is desorbed are approximately equal. The adsorption and desorption modes are determined primarily by variations in the sorbent temperature. In another preferred operating mode, the temperatures at which adsorption and desorption occur are essentially equal (and may be very high, e.g., at least 700° F., can be between 500-1000° F. For this case, the adsorption and desorption modes are determined primarily by variations in the operating pressure. This operating mode is referred to as Pressure-Swing-Adsorption (PSA) and is a well-known separation technique. The high-capacity sorbent described herein may be used in either operating mode. In a preferred embodiment, sorbent is used to remove mercury from a gas stream at a gas pressure of sixty pounds per square inch gauge (psig) and a temperature of 500° F. In this embodiment, mercury is released from the sorbent when the pressure is reduced by less than ten percent (five psig) while the same sorption temperature is maintained. Laboratory testing at 4 atmospheres (atm) gauge) indicated that a pressure swing of 0.6 atm was sufficient to cause desorption. Applicants expect typical operation to be in the range of 15-80 atm.

In a preferred embodiment, the invention is a sorbent particle comprising: a vermiculite having a plurality of ion-exchange sites; a plurality of polyvalent metal ions exchanged at some of said ion-exchange sites; and a product of a plurality of thiocarbonate ions having chemically reacted with at least some of said polyvalent metal ions (e.g., to form a plurality of metal sulfides and/or metallic polythiocarbonate/sulfides). In this embodiment, the sorbent has a largest dimension of less than about twenty micrometers and said sorbent particle is operative to capture at least ninety percent of the ionic and elemental mercury present in a flue gas containing acid gases (e.g., $SO_2$, NO and $NO_2$, and/or HCl) to which it is exposed.

In another preferred embodiment, the invention is a sorbent particle comprising: a montmorillonite having a plurality of ion-exchange sites; a plurality of polyvalent metal ions exchanged at some of said ion-exchange sites; and a product of a plurality of thiocarbonate ions chemically having reacted with at least some of said polyvalent metal ions. In this embodiment, the sorbent particle has a largest dimension of less than about twenty micrometers and said sorbent particle is operative to capture at least some of the ionic and elemental mercury present in a flue gas containing acid gases to which it is exposed.

In yet another preferred embodiment, the invention is a sorbent particle comprising: a cryptocrystalline phyllosilicate having a plurality of ion-exchange sites; a plurality of polyvalent metal ions exchanged at some of said ion-exchange sites; and a product of a plurality of thiocarbonate ions chemically reacted with at least some of said polyvalent metal ions. In this embodiment, the sorbent particle has a largest dimension of less than about twenty micrometers and said sorbent particle is operative to capture at least some of the ionic and elemental mercury present in flue gas to which it is exposed.

In a further preferred embodiment, the invention is a sorbent comprising: a phyllosilicate having a plurality of ion-exchange sites; a plurality of polyvalent metal ions exchanged at some of said ion-exchange sites; and a product of a plurality of thiocarbonate ions having chemically reacted with at least some of said polyvalent metal ions. In this embodiment, the sorbent is operative to accomplish sustained removal of the ionic and elemental mercury present in an acidic flue gas to which it is exposed.

In another preferred embodiment, the invention is a sorbent comprising: a non-zeolitic, amorphous aluminosilicate having a plurality of ion-exchange sites; a plurality of polyvalent metal ions exchanged at some of said ion-exchange sites; and a product of a plurality of thiocarbonate ions having chemically reacted with at least some of said polyvalent metal ions. In this embodiment, the sorbent is essentially devoid of copper and polysulfides.

In another preferred embodiment, the invention is a composition of matter consisting essentially of: a hydrated laminar magnesium aluminum ironsilicate having a plurality of ion-exchange sites; a polyvalent metal ion derived from a highly acidic solution exchanged at some of said ion-exchange sites; and a plurality of thiocarbonate ions chemically reacted with some of said polyvalent metal ions.

In another preferred embodiment, the invention is a composition of matter made by combining: phyllosilicate substrate material having a plurality of ion-exchange sites at which cations are exchangeable; a plurality of polyvalent metal ions derived from a highly acidic solution that are exchanged at some of said ion-exchange sites; and a plurality of thiocarbonate ions which are chemically reactable with some of said polyvalent metal ions.

In a further preferred embodiment, the invention is a composition made by combining effective amounts of: means for supporting having a first layered structure and a plurality of ion-exchange sites at which cations are exchangeable; a plurality of polyvalent metal ions which are reversibly substituted at some of said ion-exchange sites; and a plurality of thiocarbonate ions which are chemically reacted to some of said polyvalent metal ions to produce a second layered structure having an inter-layer spacing of about five nanometers. In this embodiment, the composition is capable of removing mercury from a gas stream containing trace amounts of acid gases.

In another preferred embodiment, the invention is a composition made by combining effective amounts of: a synthetic montmorillinite having a plurality of ion-exchange sites at which cations are exchangeable; a plurality of polyvalent metal ions in a highly acidic solution which are reversibly substituted at some of said ion-exchange sites; and a plurality of sulfide ions which are chemically reacted to some of said polyvalent metal ions. In this embodiment, the composition is essentially devoid of polysulfide ions and is capable of sorbing mercury from a gas.

In another preferred embodiment, the invention is a composition made by combining effective amounts of: a synthetic montmorillinite having a plurality of ion-exchange sites at which cations are exchangeable; a plurality of polyvalent metal ions in a highly acidic solution which are reversibly substituted at some of said ion-exchange sites; and a plurality of thiocarbonate ions which are chemically reacted to some of said polyvalent metal ions. In this embodiment, the composition is capable of sorbing mercury from a gas.

The invention is also a process and apparatus for preparing the sorbent. In a preferred embodiment, the invention is a process for the preparation of sorbent particles for ionic and elemental mercury comprising: (a) reducing the size of a phyllosilicate support material having cation sites, the material being selected from the class consisting of vermiculites and montmorillonites, to a particle having a largest dimension of less than about twenty micrometers; (b) providing the particle of step (a) with at least one cation capable of forming an insoluble sulfide and selected from the group consisting of antimony arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof; and (c) contacting the cation-containing particle of step (b) with a solution containing a thiocarbonate to produce a sorbent particle that is operative to capture at least some of the ionic and elemental mercury present in flue gas containing trace amounts of acid gas species to which it is exposed.

In another preferred embodiment, the invention is a process for the preparation of adsorbent compositions for elemental mercury comprising: providing a support material selected from the class consisting of phyllosilicates with at least one cation capable of forming an insoluble sulfide and selected from the group consisting of antimony arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof; and contacting the cation-containing support material of the foregoing step with a thiocarbonate.

In another preferred embodiment, the invention is a process for producing a sorbent particle comprising: reducing the size of a phyllosilicate material (e.g., by grinding or other conventional means) to produce a phyllosilicate particle having a largest dimension of less than about twenty micrometers; contacting (e.g., in a first reactor) the phyllosilicate particle with a highly acidic solution containing a plurality of polyvalent metal ions other than copper ions to produce an exchanged phyllosilicate particle; separating the exchanged phyllosilicate particle from the solution; contacting (e.g., in a second reactor) the exchanged phyllosilicate particle with a fluid containing a plurality of thiocarbonate ions to produce an amended phyllosilicate particle; and separating the amended phyllosilicate particle from the fluid to produce a sorbent particle that is operative to capture at least some of the ionic and elemental mercury present in flue gas to which it is exposed.

In a further preferred embodiment, the invention is a process for producing a sorbent particle comprising: reducing the size of a vermiculite material to produce a vermiculite particle having a first layered structure and a largest dimension of less than about twenty micrometers; contacting the vermiculite particle with a solution containing a plurality of polyvalent metal ions to produce an exchanged vermiculite particle; separating the exchanged vermiculite particle from the solution; contacting the exchanged vermiculite particle with a fluid containing a plurality of thiocarbonate ions to produce an amended vermiculite particle containing an amendment having a second layered structure; and separating the amended vermiculite particle from the fluid to produce a sorbent particle that is operative to capture at least some of the ionic and elemental mercury present in flue gas to which it is exposed.

In yet another preferred embodiment, the invention is a process for producing a sorbent particle comprising: reducing the size of a montmorillonite material to produce a montmorillonite particle having a largest dimension of less than about twenty micrometers; contacting the montmorillonite particle with a solution containing a plurality of polyvalent metal ions to produce an exchanged montmorillonite particle; separating the exchanged montmorillonite particle from the solution; contacting the exchanged montmorillonite particle with a fluid containing a plurality of thiocarbonate ions to produce an amended montmorillonite particle; and separating the amended montmorillonite particle from the fluid to produce a sorbent particle that is operative to capture at least some of the ionic and elemental mercury present in flue gas to which it is exposed.

In another preferred embodiment, the invention is a process for producing a sorbent comprising: contacting a phyllosilicate substrate material with a solution containing a polyvalent metal ion to produce an exchanged phyllosilicate; separating the exchanged phyllosilicate from the solution; contacting the exchanged phyllosilicate with a fluid containing a thiocarbonate ion to produce an amended phyllosilicate; separating the amended phyllosilicate from the fluid to produce a sorbent. Preferably, the process further comprises washing the exchanged phyllosilicate after it is separated from the solution and/or washing the amended phyllosilicate after it is separated from the fluid and/or drying the amended phyllosilicate after it is washed and/or processing the solution separated from the exchanged phyllosilicate using a technique selected from the group consisting of reusing the solution, and treating the solution to recover unused metal ions. Preferably, the pyllosilicate substrate material is contacted with a solution containing a polyvalent metal ion selected from the group consisting of a bivalent tin ion, a tetravalent tin ion, a bivalent iron ion, a trivalent iron ion, a titanium ion, a manganese ion, a zirconium ion, a vanadium ion, a zinc ion, a nickel ion, a bismuth ion, a cobalt ion, and a molybdenum ion. Preferably, the exchanged phyllosilicate is separated from solution using settling, filtration or centrifuging. Preferably, the phyllosilicate substitute material is contacted with the solution using consisting of batch contacting, co-current contacting, and/or counter-current contacting. Preferably, the exchanged phyllosilicate is contacted with an aqueous solution comprising sodium thiocarbonate and/or potassium thiocarbonate. Preferably, the exchanged phyllosilicate is contacted with a solution containing a mixture that comprises sodium thiocarbonate and/or potassium thiocarbonate. Preferably, the fluid is an aqueous solution and the process further comprises: adjusting the pH of the aqueous solution to a pH of in the range of about 7 to about 8.

In another preferred embodiment, the invention is a sorbent production system comprising: means for contacting a silicate substrate material with a solution containing a polyvalent metal ion other than a copper ion to produce an exchanged silicate; means for separating the exchanged silicate from the solution; means for contacting the exchanged silicate with a fluid containing a thiocarbonate ion being devoid of a polysulfide ion to produce an amended silicate; means for separating the amended silicate from the fluid to produce a sorbent.

The invention is also a method and system for removing mercury from a gas stream. In a preferred embodiment, the invention is a method for removing mercury from a gas stream containing an acid gas, the method comprising: injecting and entraining a sorbent particle disclosed herein into the gas stream containing ionic and elemental mercury under conditions wherein at least a portion of said elemental and ionic mercury sorbs onto the sorbent particle during its exposure to the gas stream; and removing the sorbent particle from the gas stream. Preferably, the removing step is accomplished by means of a process selected from the group consisting of filtration, electrostatic precipitation, an inertial method, and wet scrubbing.

In a preferred embodiment, the invention is a method for removing mercury from a gas stream, the method comprising: injecting and entraining a sorbent particle disclosed herein into the gas stream containing ionic and elemental mercury under conditions wherein at least a portion of said elemental and ionic mercury sorbs onto the sorbent particle during its exposure to the gas stream; and removing the sorbent particle from the gas stream by means of a process selected from the group consisting of filtration, electrostatic precipitation, an inertial method, and wet scrubbing. Preferably, the injecting and entraining step involves injecting and entraining the sorbent particle into a flue gas stream containing a plurality acid gases including sulfur dioxide ($SO_2$) in the range of a few hundred to a few thousand parts per million (ppm), hydrogen chloride (hydrochloric acid, HCl) up to 100 ppm, and nitrogen oxides (e.g., $NO_2$) in the range of 200 to 2,000 ppm.

In a preferred embodiment, the invention is a process for removing mercury from a gas, the process comprising: contacting the gas containing mercury with a sorbent produced using a process disclosed herein.

In a preferred embodiment, the invention is a technique for removing mercury from a gas, the technique comprising: contacting a adsorbent composition disclosed herein with a gas stream containing mercury at a temperature that does not exceed 350 degrees Fahrenheit for at least one second to produce a mercury-laden adsorbent composition comprising adsorbed mercury; removing the mercury-laden composition from the gas stream; and heating the mercury-laden adsorbent composition to a temperature of about 500 degrees Fahrenheit to desorb the adsorbed mercury from the mercury-laden sorbent and produce a regenerated adsorbent composition; and removing the adsorbed mercury from the vicinity of the regenerated adsorbent composition.

In yet another preferred embodiment, the invention is a method for removing mercury from a gas, the method comprising: flowing the gas containing mercury through a fixed or fluidized bed comprised of a sorbent disclosed herein.

In a further preferred embodiment, the invention is a method for removing mercury from a gas, the method comprising: injecting and entraining a composition of matter disclosed herein into a gas stream containing mercury at an operating pressure within about plus or minus 0.5 to 1.0 psig of ambient conditions; and removing the composition of matter from the gas stream to produce a collected composition of matter that remains exposed to the gas stream and that is capable of sorption of mercury, said removing being accomplished by filtration, electrostatic precipitation, inertial methods, and/or wet scrubbing. Preferably, at least a portion of said sorption of mercury occurs onto the collected composition of matter while it remains exposed to the gas stream.

In a preferred embodiment, the invention is a system for removing mercury from a gas, the system comprising: means for flowing the gas containing mercury through a sorbent container having a bed comprising a composition described herein operating at gas temperatures greater than 500 degrees Fahrenheit and pressures greater than ambient conditions; and means for removing the mercury from the composition by reducing the operating pressure of the sorbent container, while maintaining the temperature of the composition at or near the normal operating temperature for the process.

In a preferred embodiment, the invention is a system for removing mercury from a gas, the system comprising: an injector for injecting a sorbent disclosed herein into a flue gas stream; a contactor for contacting the sorbent with the flue gas stream and producing a mercury-laden sorbent; and a separator for separating the mercury-laden sorbent from the flue gas stream. Preferably, the system further comprises: a regenerator for regenerating the mercury-laden sorbent.

In another preferred embodiment, the invention is a system for removing mercury from a flue gas, the system comprising: a source of flue gas that contains an acid gas (e.g., a power plant); means for exposing (e.g., an injection and entrainment system, a fixed bed or a fluidized bed) the flue gas to a sorbent disclosed herein. Preferably, if an injection and entrainment system is the selected means for exposing, the system also comprises means for separating the sorbent from the flue gas after the sorbent has contacted the flue gas for a time that is effective for the sorbent to capture mercury present in the flue gas.

Another preferred embodiment of the invention is a system for removing mercury from a gas, the system comprising: means for injecting a sorbent disclosed herein into a flue gas stream; means for contacting the sorbent with the flue gas stream and producing a mercury-laden sorbent; and means for separating the mercury-laden sorbent from the flue gas stream.

Another preferred embodiment of the invention is a method for removing mercury from a gas, the method comprising: a step for injecting a sorbent disclosed herein into a flue gas stream; a step for contacting the sorbent with the flue gas stream and producing a mercury-laden sorbent; and a step for separating the mercury-laden sorbent from the flue gas stream.

Another preferred embodiment of the invention is a facility that produces a flue gas that incorporates a system for removing mercury disclosed herein or a method of operating a facility that produces a flue gas in accordance with a method for removing mercury disclosed herein. In a preferred embodiment, the invention is a power plant comprising a system disclosed herein or a method for operating a power plant in accordance with a method disclosed herein. In another embodiment, the invention is a power grid energized at least in part by a power plant comprising a system for removing mercury disclosed herein. In another preferred embodiment, the invention is an incinerator comprising a system disclosed herein or a method for operating an incinerator in accordance with a method disclosed herein.

In another preferred embodiment, the invention is a concrete additive comprising a fly ash containing a sorbent disclosed herein that has been used to remove mercury from a gas stream and is mercury laden. In yet another embodiment, the invention is a method for making a concrete additive that comprises adding to a cement and aggregate mixture a fly ash containing a sorbent disclosed herein that has been used to remove mercury from a gas stream. In another embodiment, the invention is a concrete made by combining a cement, an aggregate and a fly ash containing a sorbent disclosed herein that has been used to remove mercury from a gas stream.

In another preferred embodiment, the invention is a sorbent particle comprising: a cryptocrystalline phyllosilicate having a plurality of ion-exchange sites; a plurality of polyvalent metal ions exchanged at some of said ion-exchange sites; and a plurality of inorganic polysulfide ions chemically reacted to at least some of said polyvalent metal ions; wherein said sorbent particle is essentially devoid of polysulfides said sorbent particle is operative to capture at least some of the ionic and elemental mercury present in flue gas to which it is exposed.

In yet another preferred embodiment, the invention is a sorbent comprising: a non-zeolitic, amorphous aluminosilicate having a plurality of ion-exchange sites; a plurality of polyvalent metal ions exchanged at some of said ion-exchange sites; and a plurality of inooganic polysulfide ions chemically reacted to at least some of said polyvalent metal ions; wherein said sorbent is essentially devoid of copper and polysulfides.

In a further preferred embodiment, the invention is a composition made by combining effective amounts of: means for supporting having a first layered structure and a plurality of ion-exchange sites at which cations are exchangeable; a plurality of polyvalent metal ions which are reversibly substituted at some of said ion-exchange sites; and a plurality of polysulfide ions which are chemically reacted to some of said polyvalent metal ions to produce a second layered structure having an inter-layer spacing of about five nanometers; wherein said composition comprises essentially no polysulfides and is capable of removing mercury from a gas stream containing trace amounts of acid gases.

In another preferred embodiment the invention is a composition made by combining effective amounts of: a montmorillinite having a plurality of ion-exchange sites at which cations are exchangeable; a plurality of polyvalent metal ions that are other than copper ions in a highly acidic solution which are reversibly substituted at some of said ion-exchange sites; and a plurality of polysulfide ions or thiocarbonate ions which are chemically reacted to some of said polyvalent metal ions; wherein said composition is essentially devoid of polysulfides and is capable of sorbing mercury from a gas.

In another preferred embodiment, the invention is a sorbent particle comprising: a cryptocrystalline phyllosilicate having a plurality of ion-exchange sites; a plurality of polyvalent metal ions exchanged at some of said ion-exchange sites; and a plurality of polysulfide ions or thiocarbonate ions chemically reacted to at least some of said polyvalent metal ions; wherein said sorbent particle is operative to capture at least some of the ionic and elemental mercury present in flue gas to which it is exposed.

In a further preferred embodiment, the invention is a sorbent comprising: a non-zeolitic, amorphous aluminosilicate having a plurality of ion-exchange sites; a plurality of polyvalent metal ions exchanged at some of said ion-exchange sites; and a plurality of polysulfide ions or thiocarbonate ions chemically reacted to at least some of said polyvalent metal ions.

In yet another preferred embodiment, the invention is a composition made by combining effective amounts of: means for supporting having a first layered structure and a plurality of ion-exchange sites at which cations are exchangeable; a plurality of polyvalent metal ions which are reversibly substituted at some of said ion-exchange sites; and a plurality of sulfide ions, polysulfide ions or thiocarbonate ions which are chemically reacted to some of said polyvalent metal ions to produce a second layered structure; whereby said composition is capable of removing mercury from a gas stream containing trace amounts of acid gases.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
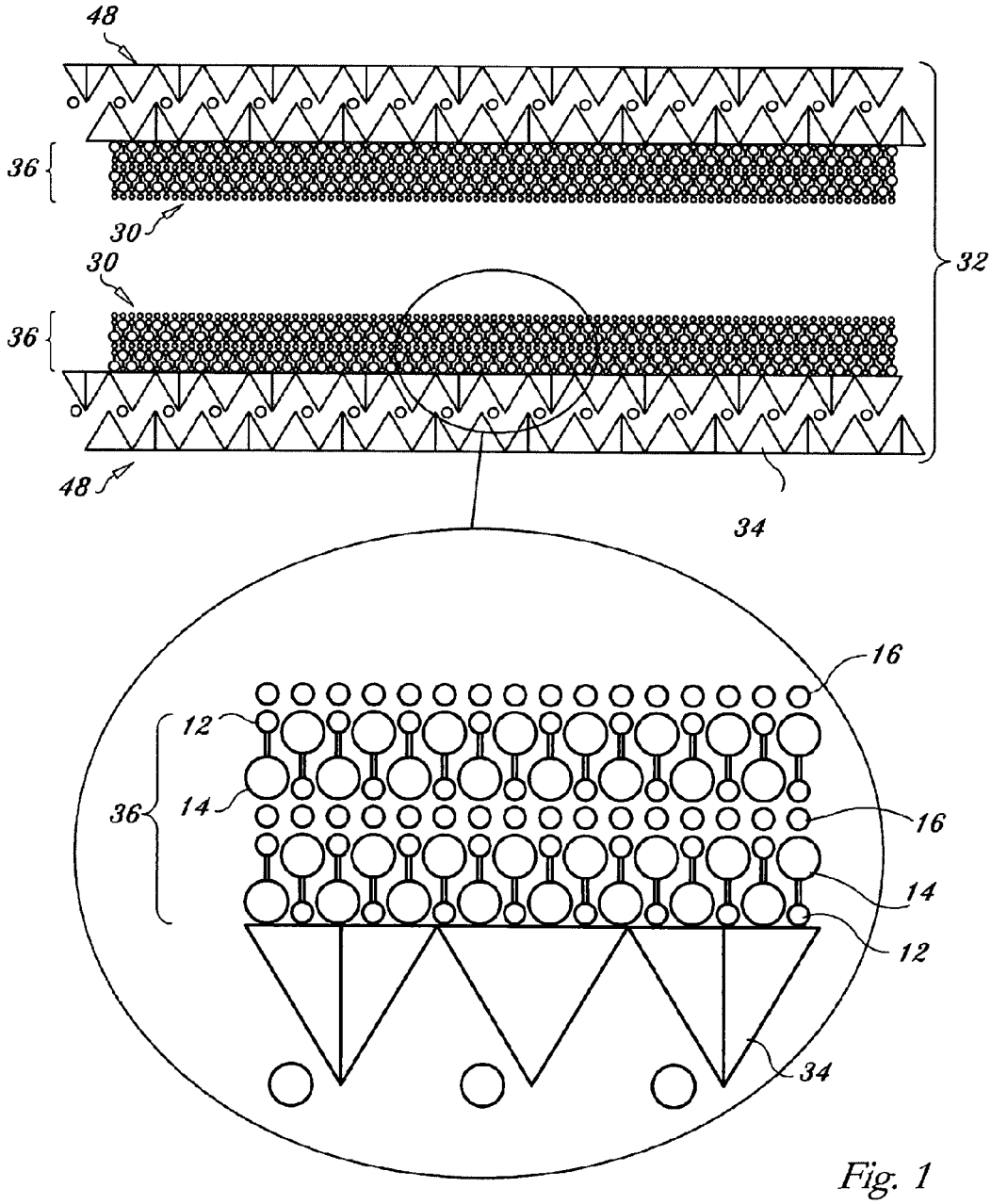
FIG. 1 is a schematic diagram that illustrates the geometry of the capture mechanism of a preferred embodiment of the invention.

The following reference numerals are used to indicate the parts and environment of the invention on the drawings:

12 metal atoms or ions, tin atoms or ions
14 sulfur atoms or ions
16 mercury atoms or ions
30 sulfide amendment
32 first layered structure
34 silicate tetrahedral structure
36 second layered structure
48 silicate substrate material, silicon substrate, substrate
56 countercurrent reactor
58 depleted solution
60 ion-exchanged substrate
62 metal solution
74 final product, sorbent
80 flue gas, other gas
82 contacting step
84 separation step
86 mercury-laden sorbent
88 sorbent regeneration step
90 mercury
92 mercury-laden sorbent stabilization and disposal step
112 coal
114 boiler
116 generator
118 power grid
122 flue gas
124 sorbent injection system
126 particulate removal system
128 disposal site
130 baghouse
132 spend sorbent disposal/mercury recovery system
134 stack

DETAILED DESCRIPTION OF THE INVENTION

Referring to FIG. 1, in a preferred embodiment, sorbent 74 of the disclosed invention is a particle comprising: a phyllosilicate having a plurality of ion-exchange sites (e.g., vermiculite or montmorillinite); a plurality of polyvalent metal ions exchanged at some of the ion-exchange sites; and a product of a plurality of thiocarbonate ions having chemically reacted to at least some of the polyvalent metal ions (e.g., a plurality of sulfide ions). Preferably, the sorbent particle has a largest dimension of less than about twenty micrometers and is operative to capture at least some of the ionic and elemental mercury present in flue gas to which it is exposed. Specifications and sources of starting materials for preferred embodiments of the invention are presented in Table 1.

TABLE 1

Specifications and sources for preferred starting materials

| Input Material | Specifications | Sources |
|---|---|---|
| Vermiculite | see WWW domain: amverco.com | American Vermiculite Corporation Kennesaw, GA |
| Montmorillonite | Clays: Hectorite/SHCa-1, Na-Montmorillonite/ SWy-1 (SWy-2), Barasym/SSM-100 Syn-1 | Clay Minerals Society Source Clays Repository University of Missouri, Columbia, MO; see WWW domain: cms.lanl.gov |
| Bentonite | Bara-Kade/Standard Bentonite Soil Sealing Grade - 200 mesh | Bentonite Performance Minerals, Denver, Colorado |
| Thio-Red | Proprietary mixture | Water Specialists Technologies, LLC, Sanford, Florida |
| Sodium Sulfide ($Na_2S$) | Anhydrous or nanohydrate Varying purity | Sigma-Aldrich, Milwaukee, WI Alfa Aesar, Ward Hill, MA |
| Calcium polysulfide ($CaS_x$) | Cascade Aqueous Solution About 30% $CaS_x$ by weight | Best Sulfur Products Fresno, CA |
| Tin(II) Chloride ($SnCl_2$) | Anhydrous or dehydrate Varying purity | Sigma-Aldrich, Milwaukee, WI Alfa Aesar, Ward Hill, MA |
| Ti(III) Chloride $TiCl_3$ | Aqueous solution, ca. 10%-20% by weight | Sigma-Aldrich, Milwaukee, WI Alfa Aesar, Ward Hill, MA |
| Fe(II) Chloride ($FeCl_2$) | Anhydrous or hydrated Varying purity | Sigma-Aldrich, Milwaukee, WI Alfa Aesar, Ward Hill, MA |
| Fe(II) Sulfate ($FeSO_4$) | Anhydrous or heptahydrate Varying purity | Sigma-Aldrich, Milwaukee, WI Alfa Aesar, Ward Hill, MA |
| Fe(III) Chloride | Anhydrous or hexahydrate | Sigma-Aldrich, Mil- |

TABLE 1-continued

| Specifications and sources for preferred starting materials | | |
|---|---|---|
| Input Material | Specifications | Sources |
| $FeCl_3$ | Varying purity | waukee, WI Alfa Aesar, Ward Hill, MA |

Sulfide amendment 30 with intercalated mercury 16 is shown attached to silicate tetrahedral structure 34 of substrate 48 in FIG. 1, which applicants' believe schematically illustrates the geometry of the capture mechanism of a preferred embodiment of the invention. In this embodiment, phyllosilicates having first layered structure 32 are amended with metal sulfides (e.g., chalcogenides) having second layered structure 36, which comprise open layers of the chalcogenides lined with both metal atoms 12 and sulfur atoms 14. In the preferred embodiment illustrated in schematic cross section in FIG. 1, the layers of the tin (Sn) ions or atoms 12 and sulfur (S) ions or atoms 14 (that together form the metal sulfide of this embodiment, tin II sulfide) are held together by weak Van der Waals bonds and thus, mercury ions or atoms 16 can enter into interlayer openings whereas acid gases are excluded and cannot interfere with the adsorption of mercury ions or atoms 16. The preferred inter-layer spacing is approximately five nanometers (nm). When sorbent 74 is used, after mercury ion atoms 16 have entered the inter-layer spaces, they are retained by interaction with the sulfur-rich environment and amalgamation with the metal atoms.

In a preferred embodiment, sorbent preparation is a multi-step process that includes the exchange of metals and addition of sulfide ions to silicate substrate material 48. Preferably, the first step in the preparation of the sorbent is an ion exchange step in which an ion exchange occurs between silicate substrate material 48 and a solution containing one or more of a group of polyvalent metals including tin (both Sn(II) and Sn(IV)), iron (both Fe(II) and Fe(III)), titanium, manganese, zirconium and molybdenum, dissolved as salts, such as the sulfate, chloride or nitrate, or as other soluble forms. The ion exchange step is preferably performed by suspending or otherwise contacting silicate substrate material 48 with the solution containing a metal ion for a period of time sufficient to complete the process step. Preferably, the solution is stirred or mixed during this time to facilitate the exchange.

When the ion exchange step is complete, the exchanged silicate substrate material is preferably separated from the solution and briefly washed with water in an exchanged silicate separation and washing step. Separation can be accomplished by any number of means, many of which are well established and generally known to those in the field of process engineering. Examples include settling, filtration, and centrifugation. In a preferred embodiment, the metal solution is reused directly or processed to recover unused metal ions.

Figure 2:
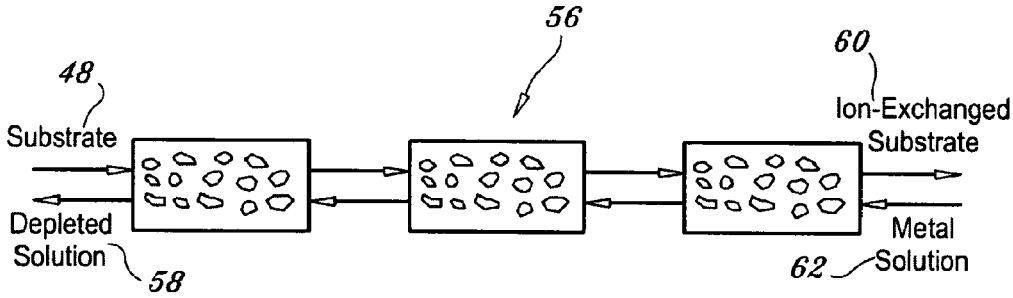
FIG. 2 is a schematic process flow diagram of a preferred embodiment of a counter-current ion exchange step.

In a preferred embodiment, contact between silicate substrate 48 and the metal ion solution occurs as a multi-step process in which quantities of substrate and solution are sequentially contacted with each other in stages. This process is preferably performed in a batch contacting, co-current or counter-current manner. As illustrated in FIG. 2, when countercurrent contact is utilized, substrate 48 is introduced to counter-current reactor 56 at the same end that depleted solution 58 is withdrawn from counter-current reactor 56. Ion-exchanged substrate 60 is removed from counter-current reactor 56 at the same end that metal solution 62 is introduced to counter-current reactor 56.

In a preferred embodiment, the second step in the preparation of the sorbent is a controlled sulfide addition step in which ions from a sulfide source are added to ion-exchanged silicate substrate 60 as described below. This is preferably accomplished by contacting ion-exchanged silicate substrate 60 with a liquid phase source of sulfide.

Preferable sources for sulfur or sulfide for liquid-phase contacting include sodium sulfide ($Na_2S$) or a compound containing sulfur with different oxidation states, e.g., calcium polysulfide ($CaS_x$), thiourea, sodium thiocarbonate, potassium thiocarbonate, or Thio-Red® compound. Thio-Red® compound is manufactured by Water Specialists Technologies, LLC, of Sanford, Fla., and is a basic polythiocarbonate organic compound that forms organo-metallic precipitates. It is a proprietary mixture that comprises sodium and potassium thiocarbonates with the generalized formula: $[Na,K]_2CS_3.nH_2O$. When a thiocarbonate is used, the thiocarbonate ion ($CS_3^{-2}$) reacts with divalent metals (M+2) to give the metal sulfide (MS) and carbon disulfide ($CS_2$) and/or metallic polythiocarbonate/sulfides. Thio-Red® compound and other of its uses are described in U.S. Pat. No. 4,943,377, the disclosure of which patent is incorporated by reference herein as if fully set forth.

When accomplished in the liquid phase, the controlled sulfide addition step is preferably accomplished by the incremental addition of a solution containing a sulfide to a liquid containing ion-exchanged silicate substrate material 60 containing the exchanged polyvalent metal ions. Preferably, during sulfide addition the pH of the liquid is monitored and the acidic pH of the exchanged silicate is adjusted by the addition of the alkaline sulfide solution to neutrality during a pH monitoring/adjustment step. Step-wise addition of the sulfide solution is complete when a desired quantity of sulfide is added or when the desired pH is obtained. During this process step, the exchanged polyvalent metal ions precipitate as an insoluble sulfide and become locked in place within the silicate lattice.

An aqueous solution comprising Thio-Red® compound is one preferred sulfide source because its pH can be adjusted and still retains its sulfide characteristic. The pH of the Thio-Red® solution is adjusted to minimize the hydrolysis of the metal cations exchanged into the ion-exchanged silicate substrate material 60 (e.g., vermiculite, bentonite, etc.). The Thio-Red® solution is treated with HCl to reduce its pH from about pH 11.8 to a pH about 7 to about 8. The pH-adjusted Thio-Red® solution is used in a manner similar to a polysulfide solution wherein the sulfide source is added to the ion-exchanged silicate substrate material 60 until the pH is between about 7 and about 8.

In a preferred embodiment, the amended silicate is then separated from the solution using a conventional separation technique and washed with water or other appropriate liquids during an amended silicate separation and washing step. Preferably, the amended silicate material is then dried using a conventional technique in an amended silicate drying step to produce final product or sorbent 74.

In a preferred embodiment, spray drying is used to separate the finished sorbent material from the sulfiding liquid. This method of separation performs the primary separation, drying, and particle sizing all in one operation. Spray drying could also be used but preferably would not be used to separate sorbent solids from the ion exchange solution(s). In a preferred embodiment, the air inlet temperature to the spray dryer is about 400° C. Preferably, outlet air temperature is maintained just above 100° C. (about 101 to about 105° C.) to prevent condensation of moisture. Slurry feed rate may be adjusted to attain the desired outlet air temperature. Dried sorbent is preferably separated from the gas stream using a cyclone followed by a baghouse.

Figure 3:
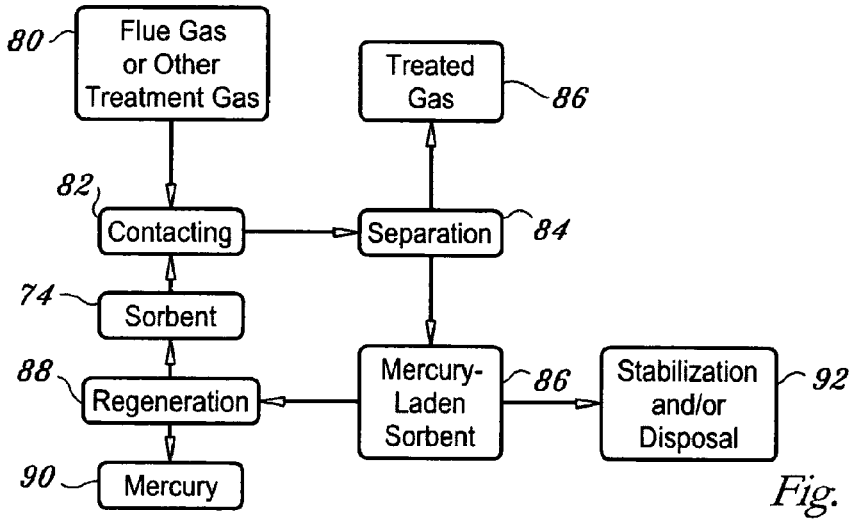
FIG. 3 is a schematic flow diagram of a preferred embodiment of a flue gas or other gas treatment process.

Referring to FIG. 3, sorbent 74 is used to absorb elemental mercury or oxidized mercury species such as mercuric chloride from flue gas and other gas 80 during contacting step 82 at temperatures from ambient to as high as 350° F. Absorption takes place while the sorbent is in contact with the gas. This can occur in a number of conventional process configurations. In a preferred embodiment, the sorbent is contained within a fixed bed in which it is substantially stationary. In this embodiment, contact between the gas and sorbent is achieved as the gas flows through the bed.

Another process configuration for use of sorbent 74 comprises directly injecting and entraining the sorbent into the gas stream. For a coal-fired power plant, sorbent 74 is preferably injected into the gas stream downstream of the boiler and remain in the gas stream until it is removed along with the flyash using an electrostatic precipitator and/or a baghouse in separation step 84. In this configuration, contact step 82 occurs while sorbent 74 is entrained in gas 80 and also during the time it is fixed to the separation device in separation step 84. In any configuration, an adequate contact time (preferably at least one or two seconds) is required to ensure proper sorption of the mercury onto or into sorbent 74 before treated gas 86 is released.

In a preferred embodiment, when mercury sorption is complete, mercury-laden sorbent 86 is stabilized and disposed of during mercury-laden sorbent stabilization and disposal step 92 using any of a variety of conventional techniques. Mercury-laden sorbent 86 may also be regenerated in regeneration step 88 by heating it to about 500° F. and maintaining it at that temperature for a time that is sufficient to desorb mercury 90 from sorbent 74. Preferably, sorbent regeneration step 88 occurs in a fixed or fluidized bed. During regeneration step 88, an inert gas such as nitrogen is preferably flowed through the bed to sweep desorbed mercury 90 away from sorbent 74. Preferably, desorbed mercury 90 is captured for reuse or disposal using any of a variety of conventional techniques.

The above description is for a preferred operating mode in which the pressures at which mercury is adsorbed onto and into sorbent 74 and at which it is desorbed are approximately equal. The adsorption and desorption modes are determined primarily by variations in the sorbent temperature. In another preferred operating mode, the temperatures at which adsorption and desorption occur are essentially equal (and may be very high, e.g. 700° F. For this case, the adsorption and desorption modes are determined primarily by variations in the operating pressure. This operating mode is referred to as Pressure-Swing-Adsorption (PSA) and is a well-known separation technique. High-capacity sorbent 74 described herein may be used in either operating mode.

Figure 4:
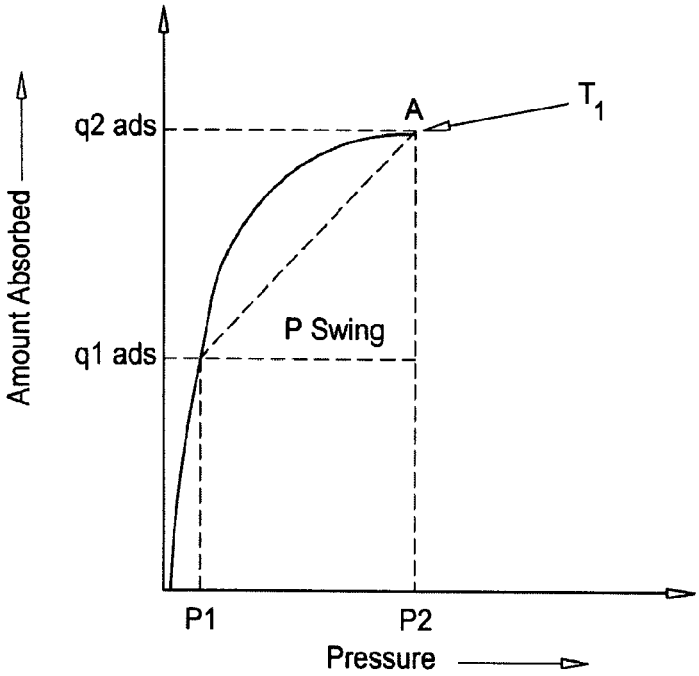
FIG. 4 is an illustration of the operation of the Pressure Swing Adsorption step of a preferred embodiment of the invention.

At higher partial pressure, a gas (e.g., gaseous mercury) is more strongly adsorbed onto a solid surface (e.g., of an adsorbent). As illustrated in FIG. 4, the Pressure Swing Adsorption (PSA) process step of a preferred embodiment of the invention relies on the fact that one can create higher partial pressure by increasing the total system pressure. More adsorbate (e.g., gas-phase mercury) is adsorbed at higher pressure and, when the pressure is reduced, the adsorbate is released, or desorbed. Unlike the more common temperature-swing adsorption, PSA can be run at constant temperature. Compared to temperature swing adsorption, PSA can be cycled more rapidly, and typically requires less energy for regeneration. PSA is commonly used for air separation and purification and recovery of hydrogen and hydrocarbons from gas streams (Jasra, R. V. et al., "Separation of Gases by Pressure Swing Adsorption," Separation Sciences and Technology, 26, 885-930, 1991).

FIG. 4 depicts how the pressure swing adsorption step is applied in the disclosed invention. A gas containing some component X (e.g., mercury) is contacted with an adsorbent at temperature $T_1$ and pressure $P_2$. The amount of X adsorbed is given by $q_{ads2}$. The absorbent is then regenerated by dropping the pressure to $P_1$, holding the temperature constant. The new equilibrium capacity is given by $q_{ads1}$, where $q_{ads1}<q_{ads2}$. The shape of the isotherm governs the concentration ratio that can be achieved in pressure-swing systems. Ideally, the process step is run in a regime where the isotherm is steep, that is, fairly low adsorbate loadings. In reality, pressure-swing systems are never truly isothermal because of heat of adsorption effects.

The disclosed amended silicate sorbent 74 is suitable for use in a pressure-swing adsorber designed to remove mercury from the high-temperature, high-pressure conditions found in gases produced in a gasifier. As illustrated in FIG. 4, in pressure-swing adsorption the contaminant is adsorbed at high pressure, P2, on sorbent 74. System pressure is then reduced to P1, holding the temperature constant at T1. At P1 sorbent has a lower capacity for the contaminant ($q_{1ads}<q_{2ads}$), and the contaminant desorbs, regenerating the sorbent.

Figure 5:
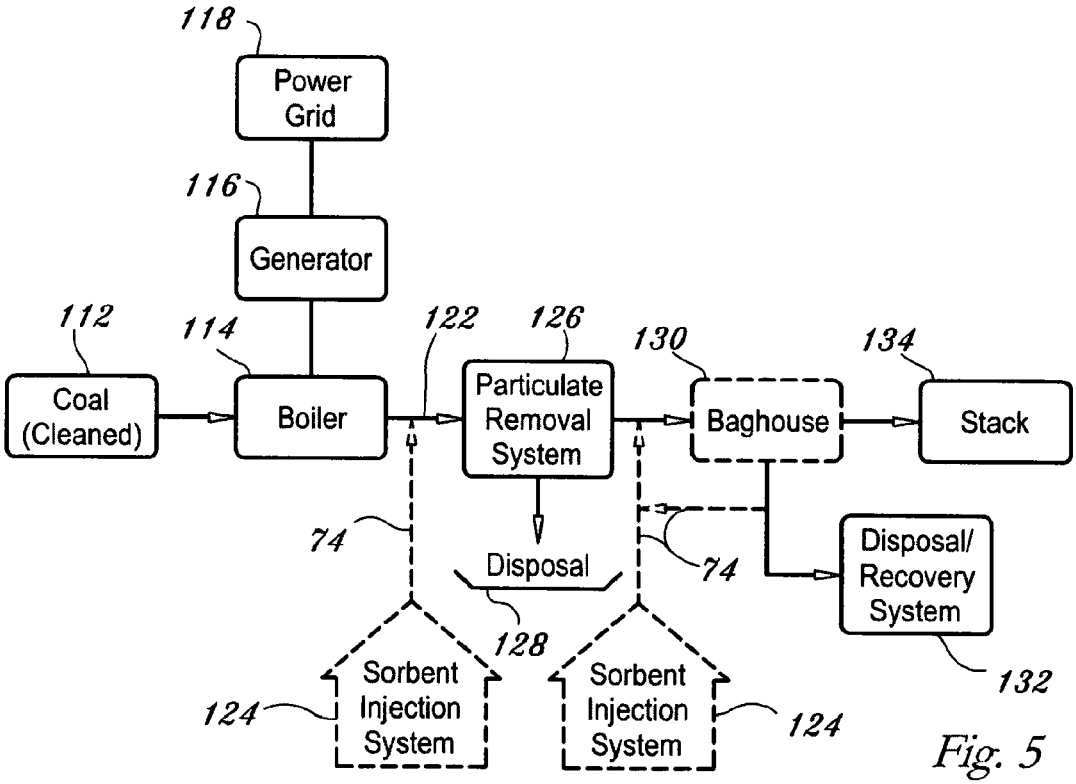
FIG. 5 is a block diagram of a preferred embodiment of the invention.

Referring to FIG. 5, another preferred embodiment of the invention is presented. In this embodiment, sorbent 74 is used to remove mercury from the flue gas of power a plant or an incinerator. In the instance of a power plant, coal 112 is burned in boiler 114 to produce steam that powers generator 116 which produces electricity that energizes power grid 118. Boiler 114 produces flue gas 122. In one embodiment, sorbent injection system 124 injects sorbent 74 into flue gas 122 before it is introduced into particulate removal system 126. Particulate removal system 126 may comprise an electrostatic precipitation system, a baghouse and/or a cyclone. In one embodiment, particulates, including particles of sorbent 74 are removed from flue gas 122 and disposal of at disposal site 128.

In another preferred embodiment, sorbent injection system 124 injects sorbent 74 into flue gas 122 after it has passed through particulate removal system 126 and before it is introduced into baghouse 130. In this embodiment, mercury-laden sorbent 86 captured in baghouse 130 is processed in spent sorbent disposal/mercury recovery system 132. In a preferred embodiment, regenerated sorbent 74 is reinjected into flue gas 122 by sorbent injection system 124. Flue gas 122 that has been treated for mercury removal is discharged from stack 134.

WORKING EXAMPLE

Spray drying was used to separate the finished sorbent material from the water slurry in a number of spray dryer tests. Spray dryer tests were performed with 10 percent and 20 percent slurries. The sorbent derived from the 20 percent slurry had higher mercury capacity compared to sorbent from the 10 percent slurry. The air inlet temperature to the spray dryer was 400° C. The outlet air temperature was maintained just above 100° C. (101-105° C.) to prevent condensation of moisture. The slurry feed rate was adjusted to attain the desired outlet air temperature. Dried sorbent was separated from the gas stream using a cyclone followed by a baghouse.

Many variations of the invention will occur to those skilled in the art. Some variations include disposal of the mercury-laden sorbent. Other variations call for regeneration of the mercury-laden sorbent. All such variations are intended to be within the scope and spirit of the invention.

What is claimed is:

1. A sorbent particle comprising:

a vermiculite having a plurality of ion-exchange sites;

a plurality of polyvalent metal ions exchanged at some of said ion-exchange sites; and a product of a plurality of thiocarbonate ions having chemically reacted with at least some of said polyvalent metal ions;

wherein said sorbent particle has a largest dimension of less than about twenty micrometers and said sorbent particle is operative to capture at least ninety percent of the ionic and elemental mercury present in a flue gas containing acid gases to which it is exposed.

2. A sorbent particle comprising:

a montmorillonite having a plurality of ion-exchange sites;

a plurality of polyvalent metal ions exchanged at some of said ion-exchange sites; and a product of a plurality of thiocarbonate ions having chemically reacted with at least some of said polyvalent metal ions;

wherein said sorbent particle has a largest dimension of less than about twenty micrometers and said sorbent particle is operative to capture at least some of the ionic and elemental mercury present in a flue gas containing acid gases to which it is exposed.

3. A sorbent particle comprising:

a cryptocrystalline phyllosilicate having a plurality of ion-exchange sites;

a plurality of polyvalent metal ions exchanged at some of said ion-exchange sites; and a product of a plurality of thiocarbonate ions having chemically reacted with at least some of said polyvalent metal ions;

wherein said sorbent particle is operative to capture at least some of the ionic and elemental mercury present in flue gas to which it is exposed.

4. A sorbent comprising:

a phyllosilicate having a plurality of ion-exchange sites;

a plurality of polyvalent metal ions exchanged at some of said ion-exchange sites; and a product of a plurality of thiocarbonate ions having chemically reacted with at least some of said polyvalent metal ions;

wherein said sorbent operative to accomplish removal of the ionic and elemental mercury present in an acidic flue gas to which it is exposed.

5. A sorbent comprising:

a non-zeolitic, amorphous aluminosilicate having a plurality of ion-exchange sites;

a plurality of polyvalent metal ions exchanged at some of said ion-exchange sites; and a product of a plurality of thiocarbonate ions having chemically reacted with at least some of said polyvalent metal ions;

wherein said sorbent is essentially devoid of copper and polysulfides.

6. A concrete additive comprising:

a fly ash containing the adsorbent composition of claim 5 that has been used to remove mercury from a gas stream and is mercury laden.

7. A composition of matter consisting essentially of:

a hydrated laminar magnesium aluminum ironsilicate having a plurality of ion-exchange sites;

a polyvalent metal ion derived from a highly acidic solution exchanged at some of said ion-exchange sites; and a plurality of thiocarbonate ions chemically reacted with some of said polyvalent metal ions.

8. A composition of matter made by combining:

phyllosilicate substrate material having a plurality of ion-exchange sites at which cations are exchangeable;

a plurality of polyvalent metal ions derived from a highly acidic solution that are exchanged at some of said ion-exchange sites; and a plurality of thiocarbonate ions which are chemically reactable with some of said polyvalent metal ions.

9. A composition made by combining:

means for supporting having a first layered structure and a plurality of ion-exchange sites at which cations are exchangeable;

a plurality of polyvalent metal ions which are reversibly substituted at some of said ion-exchange sites; and a plurality of thiocarbonate ions which are chemically reacted to some of said polyvalent metal ions to produce a second layered structure having an inter-layer spacing of about five nanometers;

wherein said composition is capable of removing mercury from a gas stream containing trace amounts of acid gases.

10. A composition made by combining:

a montmorillinite having a plurality of ion-exchange sites at which cations are exchangeable;

a plurality of polyvalent metal ions in a highly acidic solution which are reversibly substituted at some of said ion-exchange sites; and a plurality of thiocarbonate ions which are chemically reacted to some of said polyvalent metal ions;

wherein said composition is capable of sorbing mercury from a gas.

11. A concrete made by combining:

a cement;

an aggregate; and a fly ash containing the composition of claim 8 that has been used to remove mercury from a gas stream.

12. A composition made by combining:

a synthetic montmorillinite having a plurality of ion-exchange sites at which cations are exchangeable;

a plurality of polyvalent metal ions in a highly acidic solution which are reversibly substituted at some of said ion-exchange sites; and a plurality of thiocarbonate ions which are chemically reacted to some of said polyvalent metal ions;

wherein said composition is essentially devoid of polysulfide ions and is capable of sorbing mercury from a gas.

13. A sorbent particle comprising:

a cryptocrystalline phyllosilicate having a plurality of ion-exchange sites;

a plurality of polyvalent metal ions exchanged at some of said ion-exchange sites; and a plurality of inorganic polysulfide ions chemically reacted to at least some of said polyvalent metal ions;

wherein said sorbent particle is essentially devoid of polysulfides said sorbent particle is operative to capture at least some of the ionic and elemental mercury present in flue gas to which it is exposed.

14. A sorbent comprising:

a non-zeolitic, amorphous aluminosilicate having a plurality of ion-exchange sites;

a plurality of polyvalent metal ions exchanged at some of said ion-exchange sites; and a plurality of inorganic polysulfide ions chemically reacted to at least some of said polyvalent metal ions;

wherein said sorbent is essentially devoid of copper and polysulfides.

15. A composition made by combining:

means for supporting having a first layered structure and a plurality of ion-exchange sites at which cations are exchangeable;

a plurality of polyvalent metal ions which are reversibly substituted at some of said ion-exchange sites; and a plurality of polysulfide ions which are chemically reacted to some of said polyvalent metal ions to produce a second layered structure having an inter-layer spacing of about five nanometers;

wherein said composition comprises essentially no polysulfides and is capable of removing mercury from a gas stream containing trace amounts of acid gases.

16. A composition made by combining:

a montmorillinite having a plurality of ion-exchange sites at which cations are exchangeable;

a plurality of polyvalent metal ions that are other than copper ions in a highly acidic solution which are reversibly substituted at some of said ion-exchange sites; and a plurality of polysulfide ions or thiocarbonate ions which are chemically reacted to some of said polyvalent metal ions;

wherein said composition is essentially devoid of polysulfides and is capable of sorbing mercury from a gas.

17. A sorbent particle comprising:

a cryptocrystalline phyllosilicate having a plurality of ion-exchange sites;

a plurality of polyvalent metal ions exchanged at some of said ion-exchange sites; and a plurality of polysulfide ions or thiocarbonate ions chemically reacted to at least some of said polyvalent metal ions;

wherein said sorbent particle is operative to capture at least some of the ionic and elemental mercury present in flue gas to which it is exposed.

18. A sorbent comprising:

a non-zeolitic, amorphous aluminosilicate having a plurality of ion-exchange sites;

a plurality of polyvalent metal ions exchanged at some of said ion-exchange sites; and a plurality of polysulfide ions or thiocarbonate ions chemically reacted to at least some of said polyvalent metal ions.

19. A composition made by combining:

means for supporting having a first layered structure and a plurality of ion-exchange sites at which cations are exchangeable;

a plurality of polyvalent metal ions which are reversibly substituted at some of said ion-exchange sites; and a plurality of polysulfide ions or thiocarbonate ions which are chemically reacted to some of said polyvalent metal ions to produce a second layered structure;

whereby said composition is capable of removing mercury from a gas stream containing trace amounts of acid gases.

20. A concrete additive comprising:

a fly ash containing the composition of claim 19 that has been used to remove mercury from a gas stream and is mercury laden.

*21. A sorbent particle comprising:*

*a substrate having a plurality of ion-exchange sites;*

*a plurality of polyvalent metal ions exchanged at one or more of said ion-exchange sites; and*

*a product of a plurality of sulfur containing ions having chemically reacted with at least some of said polyvalent metal ions;*

*wherein said sorbent particle is operative to capture at least a portion of the mercury present in a flue gas to which it is exposed.*

*22. The sorbent particle of claim 21, wherein the substrate is formed at least partially from a metal sulfide material.*

*23. The sorbent particle of claim 21, wherein the substrate is formed at least partially from a synthetic material.*

*24. The sorbent particle of claim 21, wherein the substrate is formed at least partially from a natural material.*

*25. The sorbent particle of claim 21, wherein the substrate is formed at least partially from a material selected from the group consisting of metal oxides, aluminas, titanias, zirconias, and cerias.*

*26. The sorbent particle of claim 21, wherein the substrate is formed at least partially from a material selected from the group consisting of clays, silicas, precipitated silica, fumed silica, silica fumed, allophone, synthetic aluminosilicates, aluminas, synthetic silicas, sol-gels, and oxides.*

*27. The sorbent particle of claim 21, wherein the substrate is formed at least partially from a phyllosilicate mineral.*

*28. The sorbent particle of claim 21, wherein the sorbent is essentially devoid of copper and polysulfides.*

*29. The sorbent particle of claim 21, wherein the mercury captured by the sorbent particle is either ionic or elemental mercury.*

*30. The sorbent particle of claim 21, wherein the mercury captured by the sorbent particle is an oxidized mercury species.*

*31. The sorbent particle of claim 21, wherein the sorbent particle is operative to capture at least 10 percent of the mercury present in a flue gas.*

*32. The sorbent particle of claim 21, wherein the sorbent particle is operative to capture at least 50 percent of the mercury present in a flue gas.*

*33. The sorbent particle of claim 21, wherein the plurality of polyvalent metal ions are selected from the group consisting of chlorides, sulfates, tin, iron, titanium, manganese, zirconium, molybdenum, dissolved salts, and nitrates.*

*34. The sorbent particle of claim 21, wherein the plurality of sulfur containing ions are selected from the group consisting of hydrogen sulfide, sodium sulfide, calcium polysulfide, alkali or alkaline metal salts, organosulfur compounds, and a thiocarbonate ion.*

*35. The sorbent particle of claim 21, wherein the plurality of sulfur containing ions are derived from a liquid source.*

*36. The sorbent particle of claim 21, wherein the plurality of sulfur containing ions are derived from a solid source.*

*37. The sorbent particle of claim 21, wherein the plurality of sulfur containing ions are derived from a gas source.*

*38. The sorbent particle of claim 21, wherein said sorbent particle has a largest dimension of less than about 20 micrometers.*

*39. A sorbent comprising:*

*a substrate having a plurality of ion-exchange sites;*

*a plurality of polyvalent metal ions; and*

*a product of a plurality of sulfur containing ions having chemically reacted with at least some of said polyvalent metal ions;*

*wherein said sorbent is operative to capture at least a portion of the mercury present in a flue gas to which it is exposed.*

*40. The sorbent of claim 39, wherein the substrate is formed at least partially from a metal sulfide material.*

*41. The sorbent of claim 39, wherein the substrate is formed at least partially from a synthetic material.*

*42. The sorbent of claim 39, wherein the substrate is formed at least partially from a natural material.*

*43. The sorbent of claim 39, wherein the sorbent particle is operative to capture at least 10 percent of the mercury present in a flue gas.*

*44. The sorbent of claim 39, wherein the sorbent particle is operative to capture at least 50 percent of the mercury present in a flue gas.*

*45. The sorbent of claim 39, wherein the plurality of polyvalent metal ions are selected from the group consisting of chlorides, sulfates, tin, iron, titanium, manganese, zirconium, molybdenum, dissolved salts, and nitrates.*

*46. The sorbent of claim 39, wherein the plurality of sulfur containing ions are selected from the group consisting of hydrogen sulfide, sodium sulfide, calcium polysulfide, alkali or alkaline metal salts, organosulfur compounds, and a thiocarbonate ion.*

*47. The sorbent of claim 39, wherein the plurality of sulfur containing ions are derived from a liquid source.*

*48. The sorbent of claim 39, wherein said sorbent particle has a largest dimension of less than about 20 micrometers.*

*49. A composition, comprising:*

*a substrate having a plurality of ion-exchange sites;*

*a plurality of polyvalent metal ions which are exchanged at some of said ion-exchange sites; and*

*a plurality of sulfur containing ions which are chemically reacted to some of said polyvalent metal ions;*

*wherein said composition is capable of sorbing mercury from a gas.*

*50. A concrete made by combining:*

*a cement;*

*an aggregate; and*

*a fly ash containing a composition that has been used to remove mercury from a gas stream, the composition comprising:*

*a substrate having a plurality of ion-exchange sites;*

*a plurality of polyvalent metal ions; and*

*a plurality of sulfur containing ions which are chemically reacted to some of said polyvalent metal ions.*

* * * * *